US010108280B2

(12) United States Patent
Chiang et al.

(10) Patent No.: US 10,108,280 B2
(45) Date of Patent: Oct. 23, 2018

(54) TOUCH PANEL HAVING TWO TRANSPARENT CONDUCTIVE LAYERS WITH DIFFERENT THICKNESSES AND FABRICATION METHOD THEREOF

(71) Applicant: HENGHAO TECHNOLOGY CO., LTD., Hsinchu County (TW)

(72) Inventors: Chun-Lung Chiang, Taichung (TW); Masanori Yuki, Oamishirasato (JP); Ching-Fang Wong, Taichung (TW); Shih-Chung Lu, Taichung (TW); Ming-Hung Yang, Taichung (TW); Chin-Chang Liu, Taichung (TW)

(73) Assignee: HENGHAO TECHNOLOGY CO., LTD., Hsinchu County (TW)

( * ) Notice: Subject to any disclaimer, the term of this patent is extended or adjusted under 35 U.S.C. 154(b) by 99 days.

(21) Appl. No.: 15/239,805

(22) Filed: Aug. 17, 2016

(65) Prior Publication Data

US 2017/0115759 A1 Apr. 27, 2017

(30) Foreign Application Priority Data

Oct. 26, 2015 (TW) .............................. 104135016 A

(51) Int. Cl.
*G06F 3/041* (2006.01)
*G06F 3/044* (2006.01)
(52) U.S. Cl.
CPC ............... *G06F 3/041* (2013.01); *G06F 3/044* (2013.01); *G06F 2203/04103* (2013.01); *G06F 2203/04111* (2013.01)

(58) Field of Classification Search
CPC .................... G06F 3/041; G06F 3/044; G06F 2203/04103; G06F 2203/04111
See application file for complete search history.

(56) References Cited

U.S. PATENT DOCUMENTS 8,568,599 B1 10/2013 Yu
2014/0209444 A1* 7/2014 Lai ......................... G06F 3/044
200/600
2014/0307183 A1 10/2014 Tang
(Continued)

FOREIGN PATENT DOCUMENTS

TW M385044 U1 7/2010
TW 201403687 A 1/2014
(Continued)

*Primary Examiner* — Lisa Landis
(74) *Attorney, Agent, or Firm* — Winston Hsu

(57) ABSTRACT

A touch panel includes a substrate, a first patterned transparent conductive layer, at least one insulating block and a second patterned transparent conductive layer. The first patterned transparent conductive layer is disposed on a substrate and includes at least one first connection electrode. The insulating block is disposed on the substrate and at least partially covers the first connection electrode. The second patterned transparent conductive layer is disposed on the insulating block and the first patterned transparent conductive layer. The second patterned transparent conductive layer includes at least one second connection electrode disposed on the insulating block. A thickness of the second patterned transparent conductive layer is smaller than a thickness of the first patterned transparent conductive layer.

16 Claims, 12 Drawing Sheets

(56) References Cited

U.S. PATENT DOCUMENTS

2014/0360855 A1* 12/2014 Kim ................ G06F 3/044
                                                                          200/600
2015/0220202 A1*  8/2015 Choung ............ G06F 3/0416
                                                                          345/174
2015/0293646 A1   10/2015 Chen

FOREIGN PATENT DOCUMENTS

| TW | 201443740 A | 11/2014 |
|---|---|---|
| TW | 201539265 A | 10/2015 |

\* cited by examiner

__(1)__

TOUCH PANEL HAVING TWO TRANSPARENT CONDUCTIVE LAYERS WITH DIFFERENT THICKNESSES AND FABRICATION METHOD THEREOF

BACKGROUND OF THE INVENTION

1. Field of the Invention

The present invention relates to a touch panel and a method of fabricating the same, and more particularly, to a touch panel with connection electrodes in different directions formed by patterned transparent conductive layers of different thicknesses and a method of fabricating the touch panel.

2. Description of the Prior Art

Recently, the touch technology grows rapidly, and many consumer electronics such as mobile phones, GPS navigator systems, tablet PCs, PDAs, laptops and so on with touch sensing functions have been released. The technology of touch panels is variant, and the commonly known touch panels include a resistive touch panel, a capacitive touch panel, an optical touch panel and so on. Additionally, some commonly known electrode structures are bridge type (e.g., SITO), double layer type (e.g., DITO), one layer sensor (OLS) type and so on. In the bridge type touch panel, an insulating block is used to separate two connection electrodes of sensitive electrodes in different directions, and generally a thicker conductive material is used to form the connection electrode on the insulating block in order to decrease the resistance as much as possible and for forming the connection electrode along the contour of the insulating block. However, when a transparent conductive material such us indium tin oxide (ITO) is used to form the connection electrode, a thicker indium tin oxide may be easily effected by external stress and then crack instead, and thus the production yield and the reliability may be affected negatively.

SUMMARY OF THE INVENTION

In the present invention, one of the embodiments provides a method of fabricating a touch panel. A thinner second patterned transparent conductive layer is used to form the connection electrode on the insulating block and a thicker first patterned transparent conductive layer is used to provide relatively lower resistance in other electrodes. Accordingly, defects of the connection electrodes may be avoided while the resistance of the electrodes is still kept in a relatively lower level, and the production yield and reliability may be enhanced too.

To achieve the above object, an embodiment of the present invention provides a touch panel that includes a substrate, a first patterned transparent conductive layer, at least one insulating block and a second patterned transparent conductive layer. The first patterned transparent conductive layer is disposed on the substrate, and the first patterned transparent conductive layer includes at least one first connection electrode. The insulating block is disposed on the substrate and at least partially covers the first connection electrode. The second patterned transparent conductive layer is disposed on the insulating block and the first patterned transparent conductive layer. The second patterned transparent conductive layer includes at least one second connection electrode disposed on the insulating block. A thickness of the second patterned transparent conductive layer is smaller than a thickness of the first patterned transparent conductive layer.

In one of the embodiments of a touch panel of the present invention, the first patterned transparent conductive layer further includes a plurality of first-direction electrodes and a plurality of second-direction electrodes. The first connection electrode is disposed between two adjacent first-direction electrodes in a first direction for electrically connecting the first-direction electrodes. The second connection electrode is disposed between two adjacent second-direction electrodes in the second direction for electrically connecting the second-direction electrodes.

In one of the embodiments of a touch panel of the present invention, the first patterned transparent conductive layer further includes a plurality of first-direction electrodes. The first connection electrode is disposed between two adjacent first-direction electrodes in the first direction for electrically connecting the first-direction electrodes. The second connection electrode is disposed between two adjacent second-direction electrodes in a second direction for electrically connecting a second-direction electrodes. Each of the second-direction electrodes is composed of a part of the second patterned transparent conductive layer and a part of the first patterned transparent conductive layer.

In one of the embodiments of a touch panel of the present invention, each of the second-direction electrodes consists of a part of the second patterned transparent conductive layer and a part of the first patterned transparent conductive layer that overlap each other.

In one of the embodiments of a touch panel of the present invention, the first connection electrode is disposed between two adjacent first-direction electrodes in a first direction for electrically connecting the first-direction electrodes. The second connection electrode is disposed between two second-direction electrodes that are next to each other in a second direction for electrically connecting the second-direction electrodes. Each of the first-direction electrodes is composed of a part of the second patterned transparent conductive layer and a part of the first patterned transparent conductive layer, and each of the second-direction electrodes is composed of another part of the second patterned transparent conductive layer and another part of the first patterned transparent conductive layer.

In one of the embodiments of a touch panel of the present invention, each of the first-direction electrodes consists of a part of the second patterned transparent conductive layer and a part of the first patterned transparent conductive layer, and each of the second-direction electrodes consists of another part of the second patterned transparent conductive layer and another part of the first patterned transparent conductive layer that overlap each other.

In one of the embodiments of the present invention, the touch panel further includes at least one auxiliary electrode disposed on the insulating block, wherein the resistivity of the auxiliary electrode is lower than the resistivity of the second patterned transparent conductive layer and the resistivity of the first patterned transparent conductive layer.

In one of the embodiments of a touch panel of the present invention, the auxiliary electrode is disposed on the second connection electrode and electrically connected to the second connection electrode.

In one of the embodiments of a touch panel of the present invention, the auxiliary electrode is disposed between the second electrode and the insulating block, and the auxiliary electrode is electrically connected to the second connection electrode.

To achieve the above object, one of the embodiments of the present invention provides a method of fabricating a touch panel, and the method includes the following steps.

The first patterned transparent conductive layer is formed on a substrate, the first patterned transparent conductive layer includes a plurality of openings and a first connection electrode. The first connection electrode is disposed between two adjacent openings. At least one insulating block is formed on the substrate to cover the first connection electrode and partially the insulating block. A second transparent conductive layer is formed to cover the first patterned transparent conductive layer and the insulating block. The first patterned transparent conductive layer and the second transparent conductive layer are patterned by a patterning process for forming a plurality of first-direction electrodes, a plurality of second-direction electrodes and at least one second connection electrode. The first connection electrode is disposed between two adjacent first-direction electrodes in a second direction and electrically connecting the first-direction electrode. The second connection electrode is at least partially disposed on the insulating block and between the two second-direction electrodes that are next to each other in the second direction for electrically connecting the second-direction electrodes. The second transparent conductive layer is patterned by the patterning process to be the second patterned transparent conductive layer, and a thickness of the second patterned transparent conductive layer is smaller than a thickness of the first patterned transparent conductive layer.

In the method of fabricating the touch panel according to one embodiment of the present invention, each of the first-direction electrodes is composed of a part of the first patterned transparent conductive layer and a part of the second patterned transparent conductive layer that overlap each other.

In the method of fabricating the touch panel according to one embodiment of the present invention, each second-direction electrode is composed of a part of the first patterned transparent conductive layer and a part of the second patterned transparent conductive layer that overlap each other.

In the method of fabricating the touch panel according to one embodiment of the present invention, a second connection electrode is composed of a part of the second patterned transparent conductive layer.

According to one embodiment of the present invention, the method of fabricating the touch panel further includes forming an auxiliary electrode on the insulating block, wherein the resistivity of the auxiliary electrode is lower than the resistivity of the second patterned transparent conductivity layer and the resistivity of the first patterned transparent conductive layer.

In the method of fabricating the touch panel according to one embodiment of the present invention, the auxiliary electrode is formed on the second connection electrode and electrically connected to the second connection electrode.

In the method of fabricating the touch panel according to one embodiment of the present invention, the auxiliary electrode is formed between the second connection electrode and the insulating block, and the auxiliary electrode is electrically connected to the second connection electrode.

According to one embodiment of the present invention, the method of fabricating the touch panel further includes forming a plurality of peripheral traces on the substrate, wherein the peripheral traces are electrically connected to the first patterned transparent conductive layer and/or the second patterned transparent conductive layer, and the auxiliary electrode and the peripheral traces are formed by one identical patterned metal layer.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-6 are schematic diagrams illustrating a method of fabricating a touch panel according to a first embodiment of the present invention, wherein FIG. 2 is a cross-sectional view taken along a cross-sectional line A-A' of FIG. 1, FIG. 3 is a schematic diagram illustrating in a step subsequent to FIG. 1, FIG. 4 is a schematic diagram illustrating in a step subsequent to FIG. 3, FIG. 5 is a cross-sectional view taken along a cross-sectional line B-B' of FIG. 4, and FIG. 6 is a cross-sectional view taken along a cross-sectional line C-C' of FIG. 4.

FIGS. 9-12 are schematic diagrams illustrating a method of fabricating a touch panel according to a fourth embodiment of the present invention, wherein FIG. 10 is a schematic diagram illustrating in a step subsequent to FIG. 9, FIG. 11 is a schematic diagram illustrating in a step subsequent to FIG. 10, and FIG. 12 is a cross-sectional view taken along a cross-sectional line D-D' of FIG. 11.

DETAILED DESCRIPTION

In the following description, numerous embodiments and respective schematic diagrams and specific details are given to provide a further understanding of the present invention.

Figure 1:
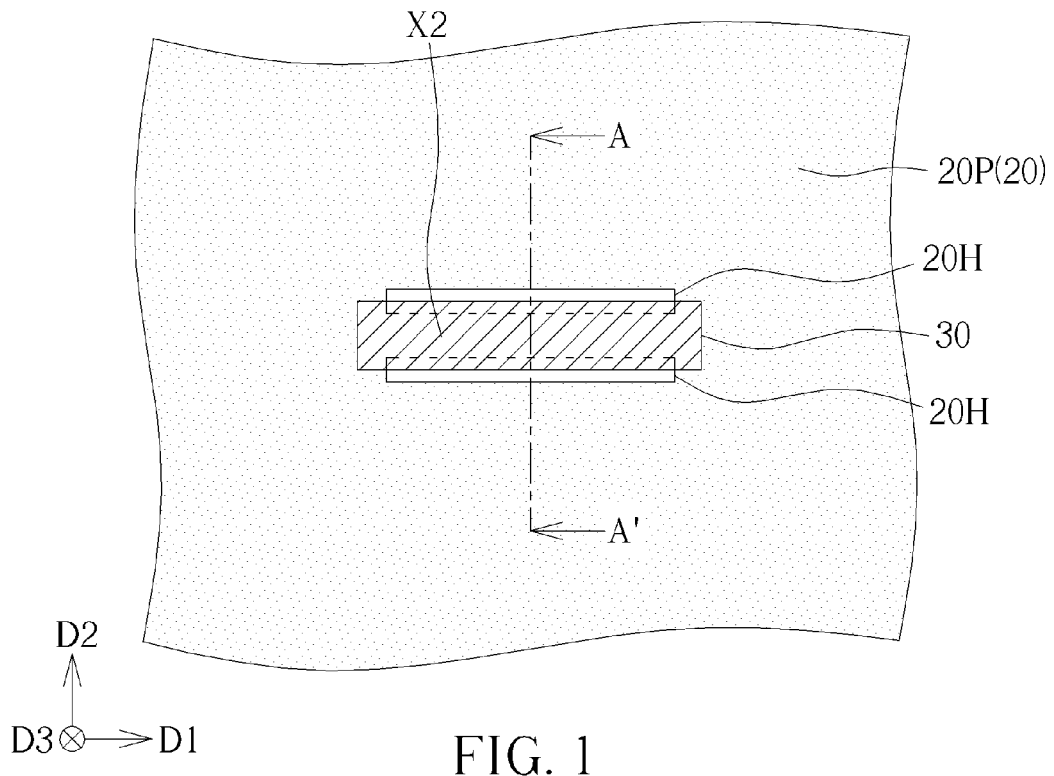
Figure 2:
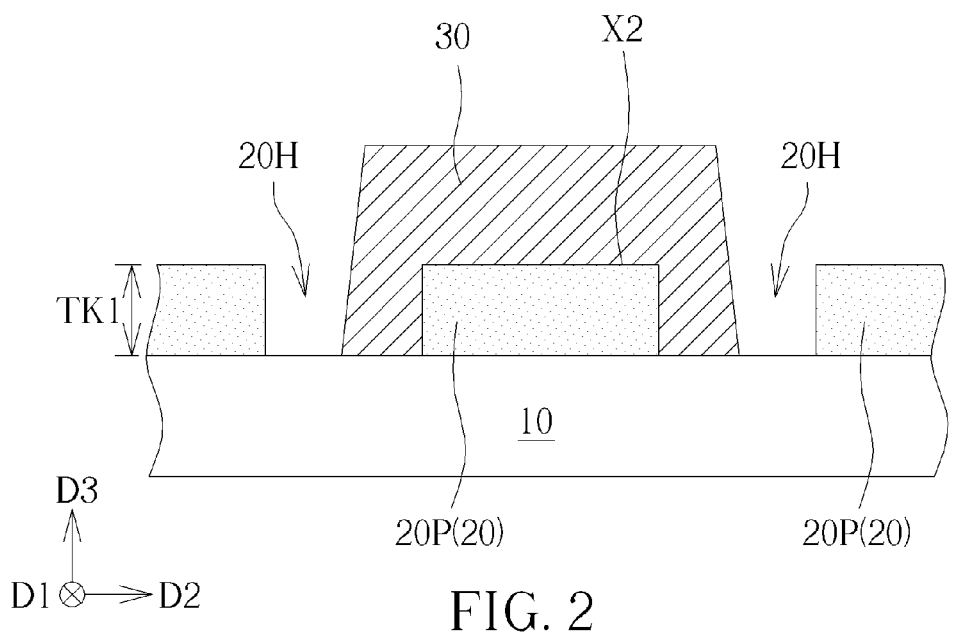

Please refer to FIGS. 1-6. FIGS. 1-6 illustrate a method of fabricating a touch panel according to a first embodiment of the present invention. For brevity purposes, please note that the figures are only for illustration and the figures may not be to scale. The scale may be further modified according to different design considerations. The method of fabricating the touch panel according to the first embodiment of the present invention includes following steps. First, as illustrated in FIG. 1 and FIG. 2, a first patterned transparent conductive layer 20P is formed on a substrate 10, the first patterned transparent conductive layer 20P includes a plurality of openings 20H. More specifically, to form the first patterned transparent conductive layer 20P, a first transparent conductive layer 20 on the substrate 10 may firstly be formed, and then the first transparent conductive layer 20 is patterned by lithography process or laser patterning process to be the first patterned transparent conductive layer 20P, but not limited thereto. Other patterning processes such as nano-printing, transfer printing and so on may also be applied to form the first patterned transparent conductive layer 20P on the substrate 10. Besides, the substrate 10 of this embodiment may include a glass substrate, a plastic substrate, a glass film, a plastic film, a transparent cover substrate, a substrate of a display, or substrate of other proper materials and/or functions. The materials of the first patterned transparent conducive layer 20P may include transparent conductive metal oxide such as indium tin oxide (ITO), indium zinc oxide (IZO), aluminum zinc oxide (AZO) or other proper transparent conductive materials. For example, the first patterned transparent conductive layer 20P may be indium tin oxide, amorphous or crystallized, and considering its need of low resistance, the first patterned transparent conductive layer 20P is crystallized indium tin oxide preferably, but not limited thereto. Besides, a thickness of the first patterned transparent conductive layer 20P (such as a first thickness TK1 illustrated in FIG. 2) is preferably thick to meet the demand of low resistance, and the thickness may range between 900 angstroms and 1500 angstroms, but not limited thereto.

The above mentioned openings 20H penetrate through the first transparent conductive layer 20, two adjacent openings 20H are arranged in a second direction D2, and the first patterned transparent conductive layer 20P between the two adjacent openings 20H in the second direction D2 may be regarded as a first connection electrode X2. In other words, the first patterned transparent conductive layer 20P may include at least one first connection electrode X2 disposed between the two adjacent openings 20H in the second direction D2. Next, at least one insulating block 30 is formed on the substrate 10. The insulating block 30 covers the first connection electrode X2 and partially covers the openings 20H at two sides on the first connection electrode X2 in a vertical direction D3. That is, at least a part of each of the openings 20H is exposed outside of the insulating block 30. The materials of the insulating block 30 may include inorganic material such as silicon nitride, silicon oxide, and silicon oxynitride, organic material such as acrylic resin, or other proper insulating materials.

Figure 3:
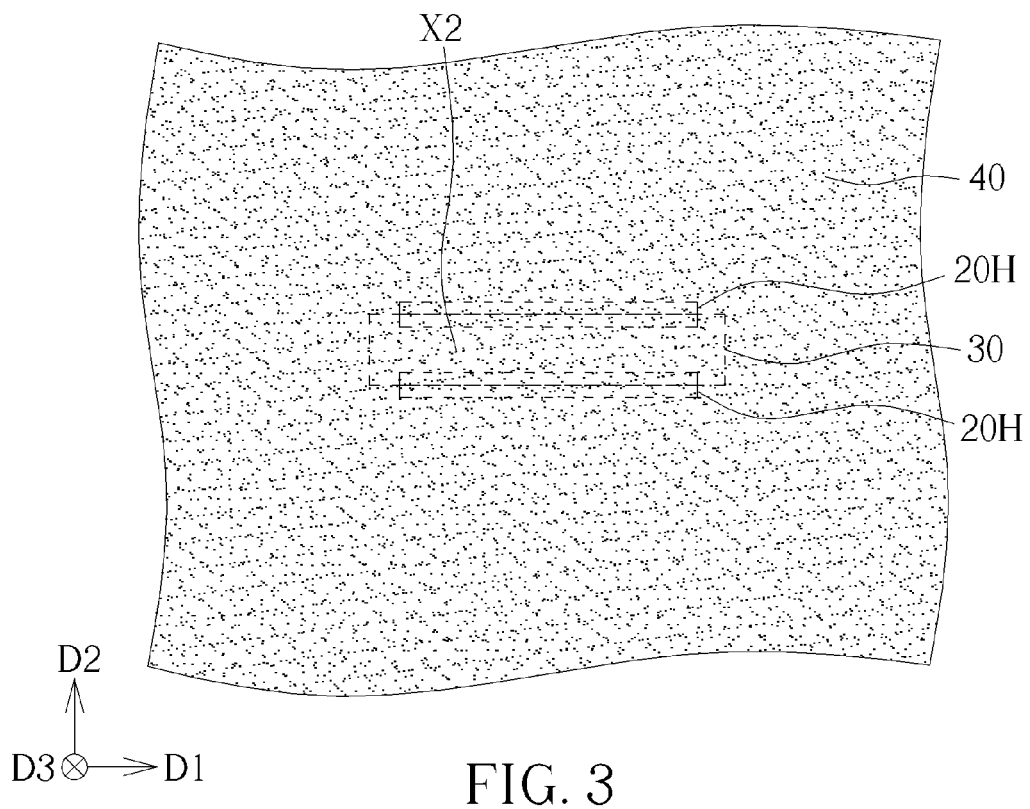

Next, as illustrated in FIG. 3, a second transparent conductive layer 40 is formed and covers the first patterned transparent conductive layer 20P, the openings 20H and the insulating block 30 in the vertical direction D3. The materials of the second transparent conductive layer 40 may also include transparent conductive metal oxide such us indium tin oxide, indium zinc oxide, aluminum zinc oxide or other proper transparent conductive materials. The material of the second transparent conductive layer 40 may be identical to or different from the material of the first transparent conductive layer 20. Besides, when the material of the second transparent conductive layer 40 is indium tin oxide, the second transparent conductive layer 40 may be amorphous or crystalline.

Figure 4:
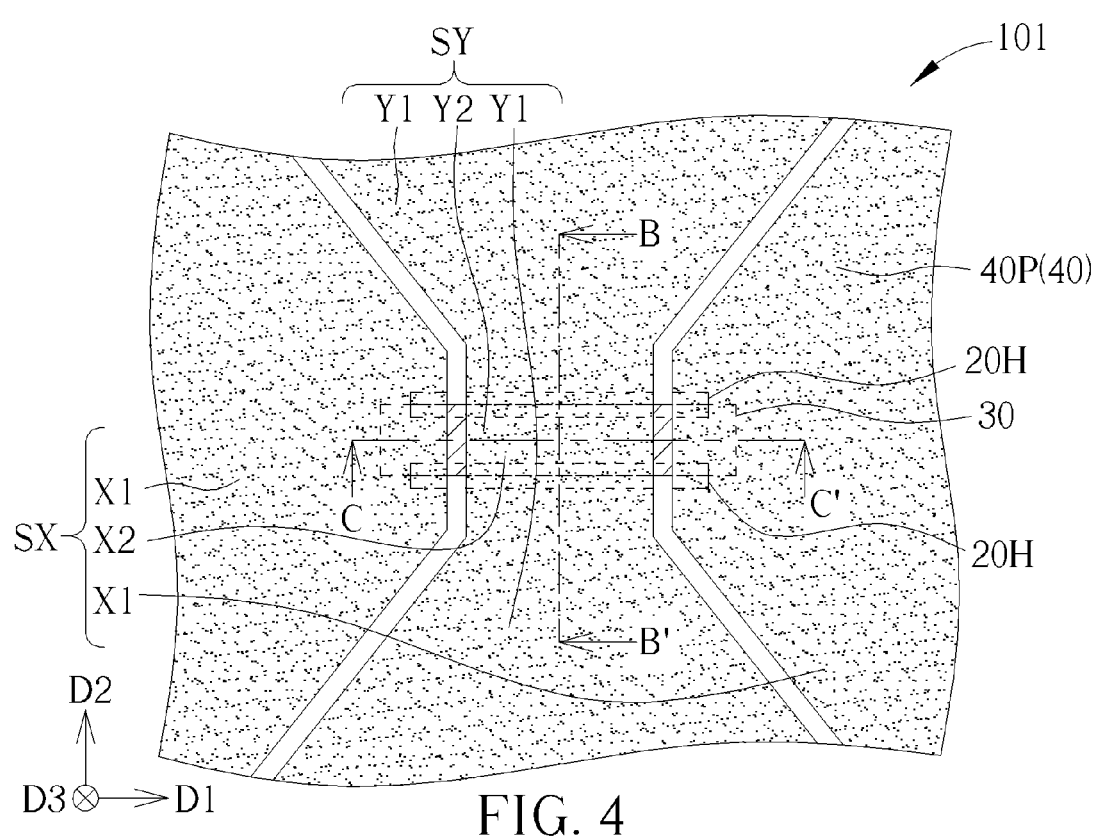
Figure 5:
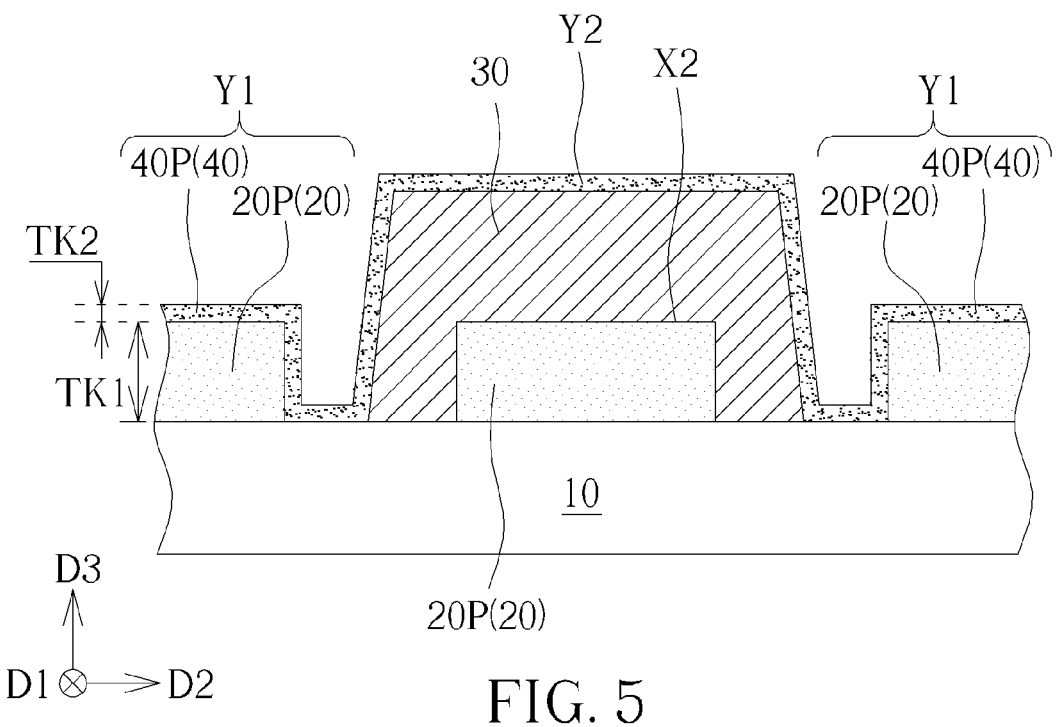
Figure 6:
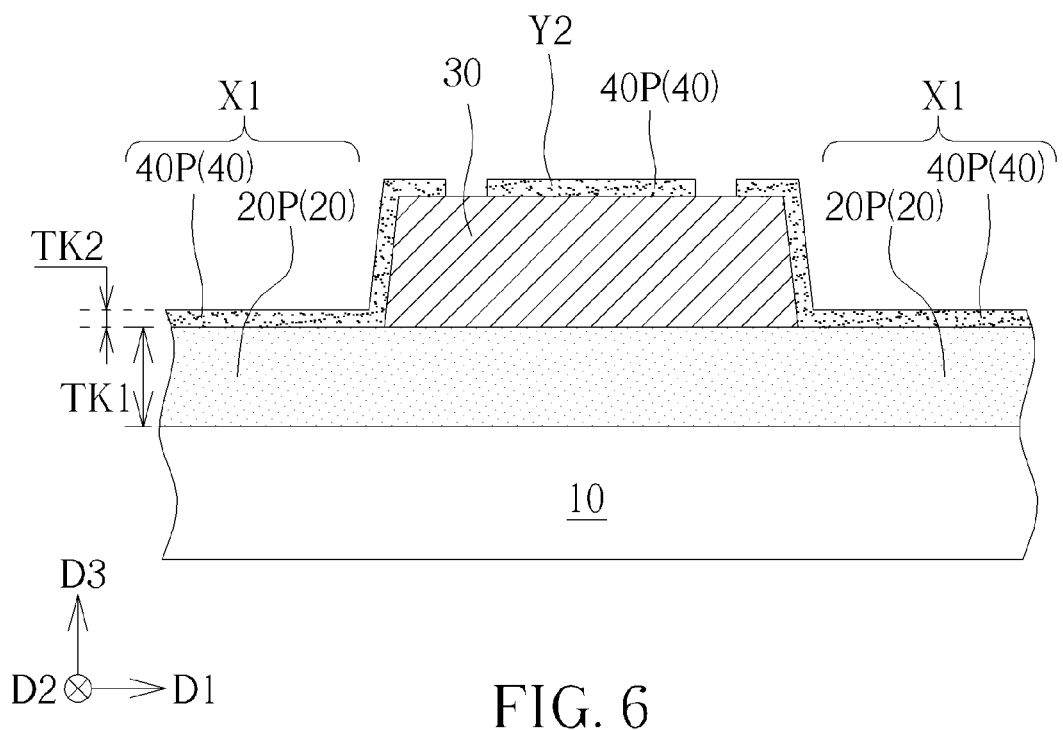

Then, as illustrated in FIGS. 4-6, the first patterned transparent conductive layer 20P and the second patterned transparent conductive layer 40 are patterned by the patterning process to form a plurality of first-direction electrodes X1, a plurality of second direction electrodes Y1 and at least one second connection electrode Y2. The first connection electrode X2 is disposed between two adjacent first-direction electrodes X1 in a first direction D1 for electrically connecting the first direction electrodes X1. The second connection electrode Y2 is disposed at least partially on the insulating block 30 and between two adjacent second-direction electrodes Y1 in the second direction D2 for electrically connecting the second-direction electrodes Y1. The first direction D1 is orthogonal to the second direction D2 preferably, but not limited thereto. The second transparent conductive layer 40 is patterned by the patterning process to be the second patterned transparent conductive layer 40P, and a thickness of the second patterned transparent conductive layer 40P (such as a second thickness TK2 shown in FIG. 5) is smaller than a thickness of the first patterned transparent conductive layer 20P (such as the first thickness TK1 shown in FIG. 5). For example, the second thickness TK2 of the second patterned transparent conductive layer 40P may range between 300 angstroms and 600 angstroms preferably, but not limited thereto. Furthermore, in this embodiment, each of the first-direction electrodes X1 is composed of a part of the first patterned transparent conductive layer 20P and a part of the second patterned transparent conductive layer 40P that overlap each other in the vertical direction D3, each of the second-direction electrodes Y1 is composed of another part of the first patterned transparent conductive layer 20P and another part of the second patterned transparent conductive layer 40P that overlap each other in the vertical direction D3, and the second connection electrode Y2 is composed of further another part of the second patterned transparent conductive layer 40P. In other words, in this embodiment, the first-direction electrode X1 may consist of two transparent conductive layers with different thicknesses, the second-direction electrode Y1 may also consist of two transparent conductive layers with different thicknesses. The first connection electrode X2 and the second connection electrode Y2 may respectively consist of single transparent conductive layer, but not limited thereto. In other embodiments of the present invention, apart of the second connection electrode Y2 may also consist of the first patterned transparent conductive layer 20P and the second patterned transparent conductive layer 40P that overlap each other.

The first-direction electrodes X1 and the first connection electrode X2 may form a first electrode series SX that extends along the first direction D1. The second-direction electrodes Y1 and the second connection electrode Y2 may form a second electrode series SY that extends along the second direction D2. The first electrode series SX and the second electrode series SY cross and partially overlap each other, and the overlap parts of the first electrode series SX and the second electrode series SY are electrically insulated from each other by the insulating block 30. In other words, the first-direction electrodes X1 and the second-direction electrodes Y1 are disposed on the same surface. The first connection electrode X2 and the first patterned transparent conductive layer 20P in the first-direction electrodes X1 are monolithically formed and connected with each other directly. The second connection electrode Y2 is formed straddling the insulating block 30. The second connection electrode Y2 and the second patterned transparent conductive layer 40P in the second-direction electrode Y1 are monolithically formed and connected with each other directly. By the above mentioned method of fabricating the touch panel, a touch panel 101 illustrated in FIGS. 4-6 can be formed. Besides, in the method of this embodiment, another protection layer (not illustrated) may be formed and cover the first electrode series SX and the second electrode series SY depend on the circumstances.

As illustrated in FIGS. 4-6, the touch panel 101 in this embodiment includes the substrate 10, the first patterned transparent conductive layer 20P, at least one insulating block 30 and the second patterned transparent conductive layer 40P. The first patterned transparent conductive layer 20P is disposed on the substrate 10, and the first patterned transparent conductive layer 20P includes at least one first connection electrode X2. The insulating block 30 is disposed on the substrate 10 and at least partially covers the first connection electrode X2. The second patterned transparent conductive layer 40P is disposed on the insulating block 30 and the first patterned transparent conductive layer 20P, the second patterned transparent conductive layer 40P includes at least one second connection electrode Y2 disposed on the insulating block 30 and the first patterned transparent conductive layer 20P, and the second thickness TK2 of the second patterned transparent conductive layer 40P is smaller than the first thickness TK1 of the first patterned transparent conductive layer 20P. The first connection electrode X2 is disposed between two first-direction electrodes X1 in the first direction D1 for electrically connecting the first-direction electrodes X1, and the second connection electrode Y2 is disposed between two second-direction electrodes Y1 in the second direction D2 for electrically connecting the second direction electrodes Y1. In the present embodiment, each of the first-direction electrodes X1 preferably consists of a part of the second patterned transparent conductive 40P and a part of the first patterned transparent conductive 20P that overlap each other preferably, and each of the second-direction electrodes Y1 consists of another part of the second patterned transparent conductive layer 40P and another part of the first patterned transparent conductive 20P that overlap each other preferably, but not limited thereto. In other embodiments of present invention, more layers such as three layers of transparent conductive layer may be applied to form the first-direction electrode X1 and/or the second-direction electrode Y1, or a thin metal layer may be disposed between the first patterned transparent conductive layer 20P and the second patterned transparent conductive layer 40P that overlap each other to form the first-direction electrode X1 and/or the second-direction electrode Y1. Besides, the first patterned transparent conductive layer 20P and the second patterned transparent conductive layer 40 are patterned simultaneously so the first patterned transparent conductive layer 20P and the second patterned transparent conductive layer 40P that overlap each other in the vertical direction D3 are preferably identical in shape substantially, but not limited thereto.

It is worth noting that, in this embodiment, the second patterned transparent conductive layer 40P, which is relatively thinner, is used to form the second connection electrode Y2 straddling the insulating block 30. Therefore, crack issues induced by external stresses applied to the second connection electrode Y2 may be reduced, and the production yield and the reliability may be enhanced accordingly. Besides, in the present invention, the first patterned transparent conductive layer 20P, which is relatively thicker, is used to form the first connection electrode X2, at least a part of each of the first-direction electrodes X1 and at least a part of each of the second-direction electrodes Y1, so the effect of the thinner second patterned transparent conductive layer 40P to the overall resistance of the first electrode series SX and the second electrode series SY may be compensated. Besides, by the method of fabricating the touch panel of this embodiment, the first patterned transparent conductive layer 20P and the second transparent conductive layer 40 may be simultaneously patterned by the patterning process for forming the first-direction electrode X1 and the second-direction electrode Y1. The mismatch between the first patterned transparent conductive layer 20P and the second patterned transparent conductive layer 40P in the first-direction electrodes X1 and/or the second-direction electrodes Y1 that comes from misalignment may be avoided, and the structural and electrical uniformity between the first-direction electrodes X1 and/or the second-direction electrodes Y1 may be improved accordingly.

The following description illustrates the variant embodiments of the present invention. In order to simplify, the following shows the difference between variant embodiments and the same parts are not detailed redundantly. Besides, the same components in each embodiment of the present invention are labeled with the same mark, for the ease of comparison.

Figure 7:
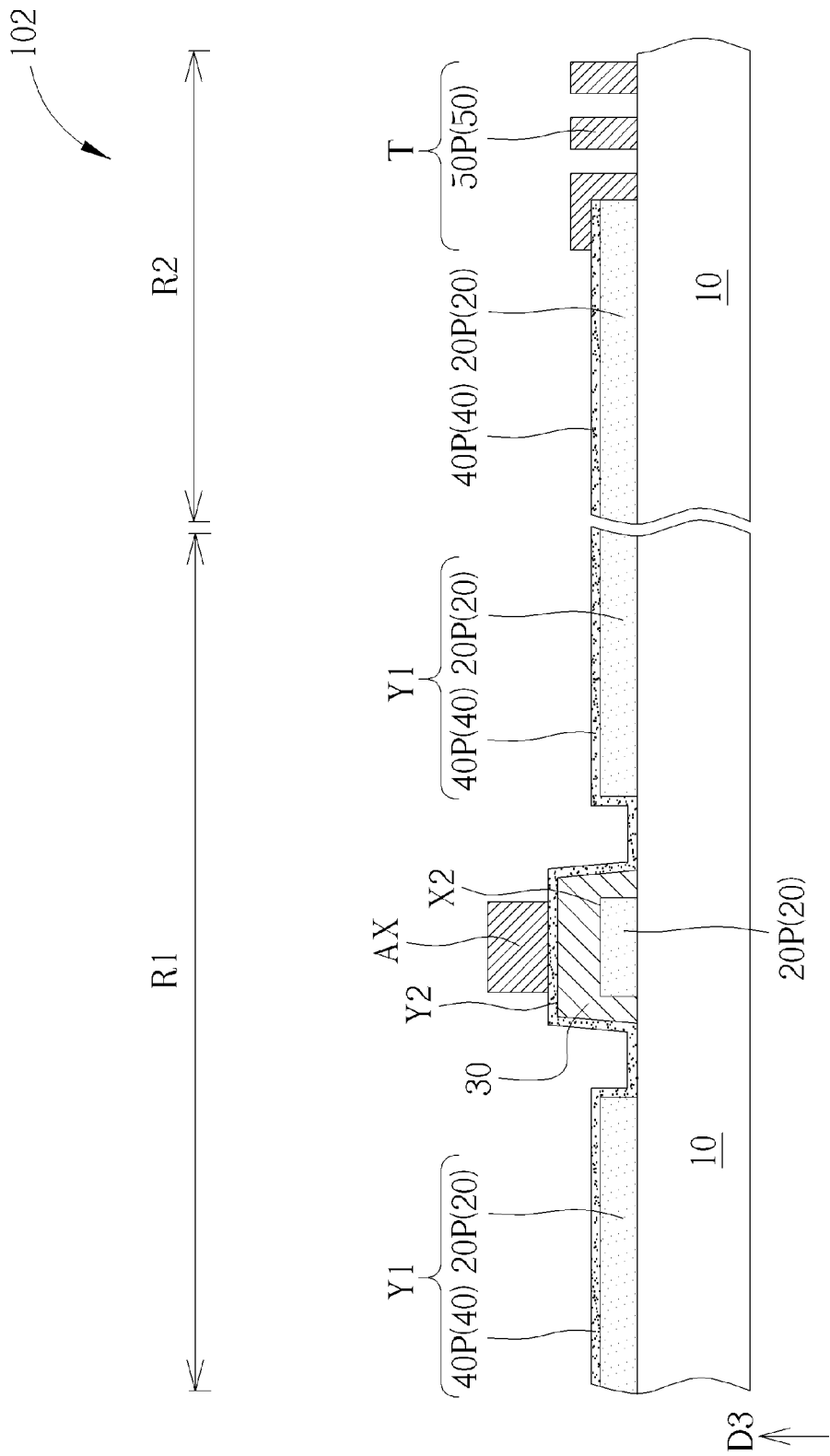
FIG. 7 is a schematic diagram illustrating a touch panel according to a second embodiment of the present invention.

Please refer to FIG. 7. FIG. 7 is a schematic diagram illustrating a touch panel 102 of the second embodiment of present invention. The difference between the first and the second embodiments is the touch panel 102 may further include at least an auxiliary electrode AX disposed on an insulating block 30. The auxiliary electrode AX is also disposed on the second connection electrode Y2. The auxiliary electrode AX contacts and is electrically connected to the second connection electrode Y2. The resistivity of the auxiliary electrode AX is smaller than the resistivity of the second patterned transparent conductive layer 40P and the resistivity of the first patterned transparent conductive layer 20P, for decreasing the resistance of the materials that connect the second-direction electrodes Y1. In other words, the method of fabricating the touch panel 102 in this embodiment may further include forming the auxiliary electrode AX on the insulating block 30, and the auxiliary electrode AX of this embodiment is formed on the second connection electrode Y2 and electrically connected to the second connection electrode Y2. Besides, the method of fabricating the touch panel this embodiment may further include forming a plurality of peripheral traces T on the substrate 10 and the peripheral traces T are electrically connected to the first patterned transparent conductive layer 20P and/or the second patterned transparent conductive layer 40P. The auxiliary electrode AX and the peripheral traces T may be formed by the same patterned metal layer 50P preferably. In other words, a patterning process may be applied to a metal layer 50 and for forming the peripheral traces T and the auxiliary electrode AX simultaneously, and thus extra process of forming auxiliary electrode AX may not be needed. Besides, the first electrode series SX, the second electrode series SY and the auxiliary electrode AX for touch sensing are disposed at least mostly in a transmissive region R1, and the peripheral traces T are disposed in a peripheral region R2. Hence, in comparison with common connection electrodes that composed of metal, the auxiliary electrode AX in this embodiment does not have to be formed straddling the insulating block 30, so the area of the auxiliary electrode AX in the vertical direction D3 is relatively small, and that has a positive influence on the visual effect (such as decreasing the influence of the reflectance of metal).

Figure 8:
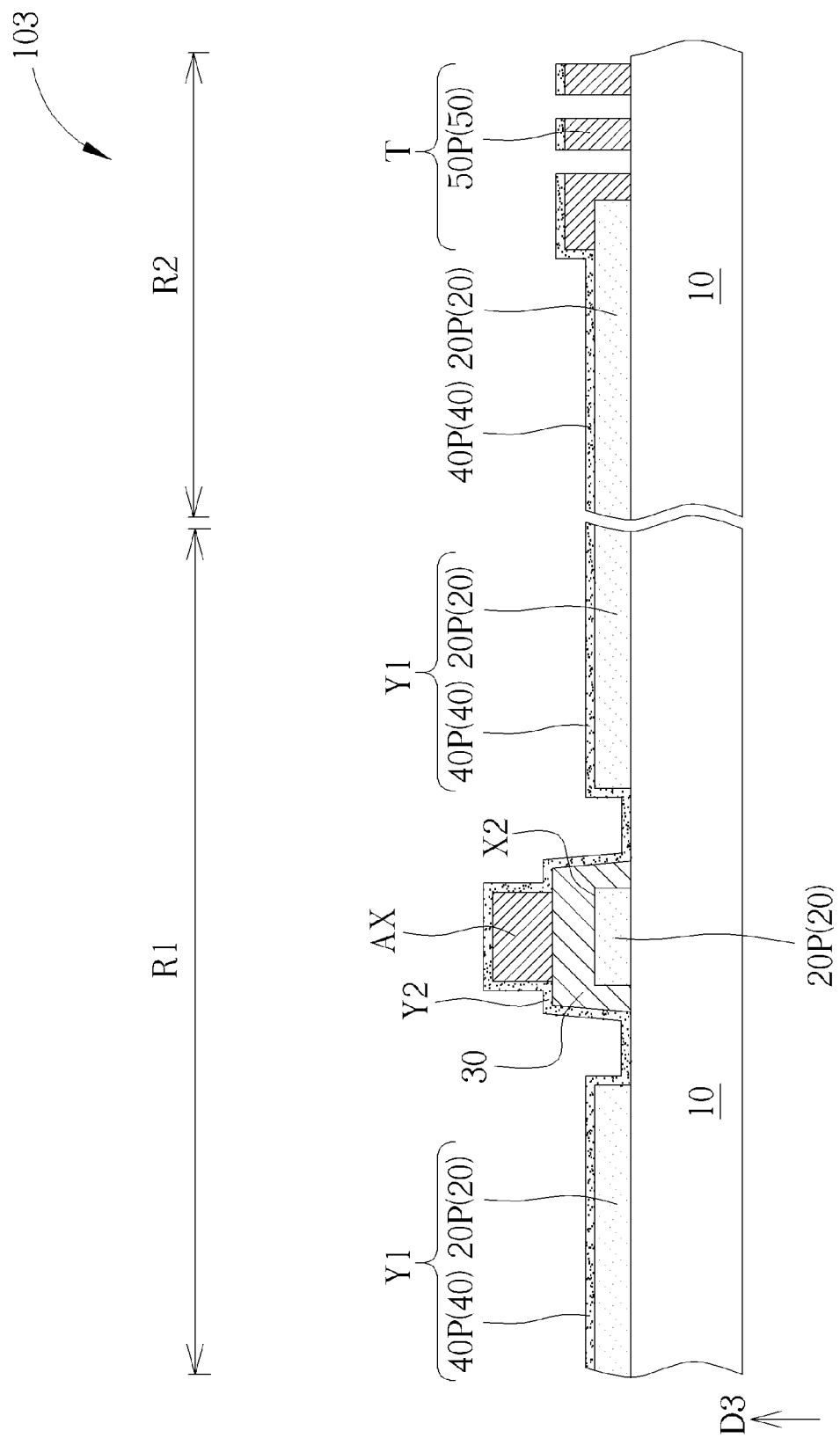
FIG. 8 is a schematic diagram illustrating a touch panel according to a third embodiment of the present invention.

Please refer to FIG. 8. FIG. 8 is schematic diagram illustrating a touch panel 103 of the third embodiment of the present invention. The difference between the second and third embodiments is that the auxiliary electrode AX in the touch panel 103 is disposed between the second connection electrode Y2 and the insulating block 30. In other words, in the method of fabricating the touch panel in this embodiment, the auxiliary electrode AX is formed between the second electrode Y2 and the insulating block 30, the patterned metal layer 50P is formed before the step of forming the second transparent conductive layer 40, and the second connection electrode Y2 is formed on the auxiliary electrode AX and electrically connected to the auxiliary electrode AX.

Figure 9:
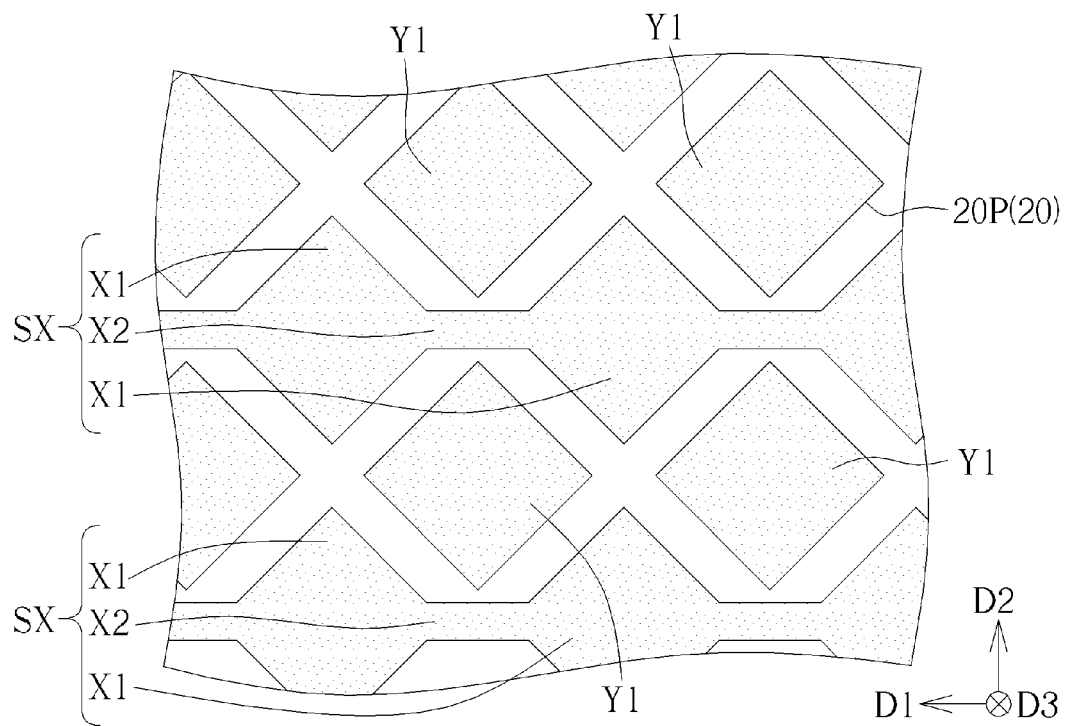
Figure 10:
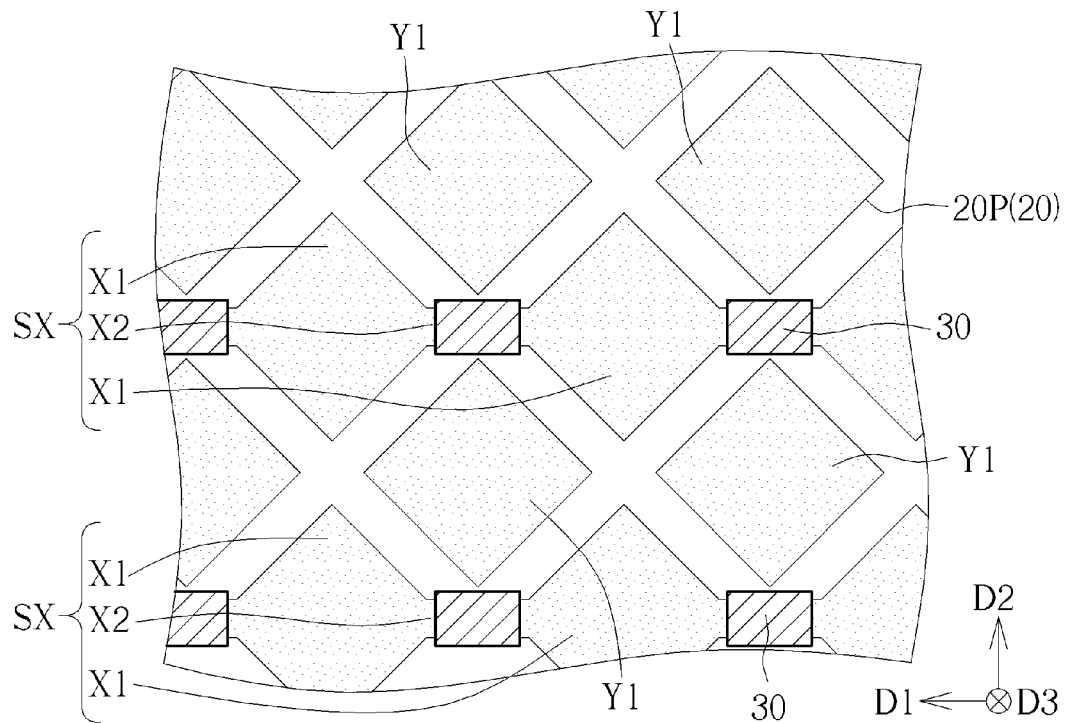
Figure 11:
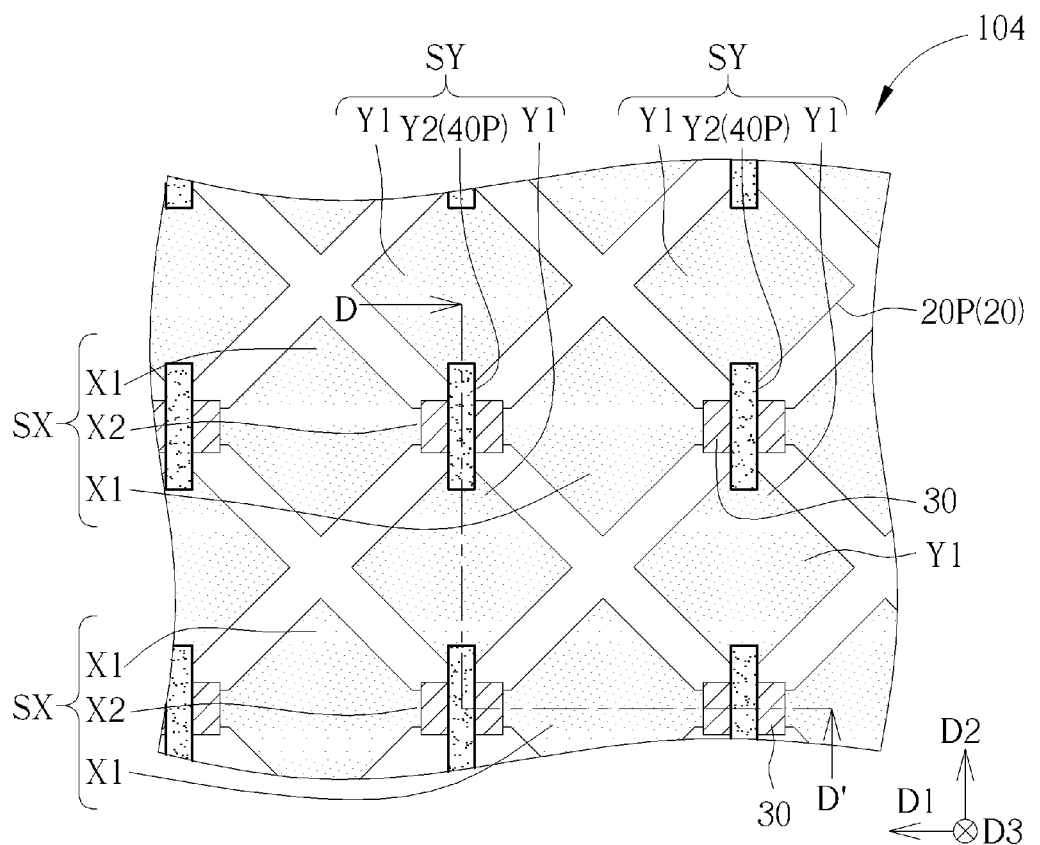
Figure 12:
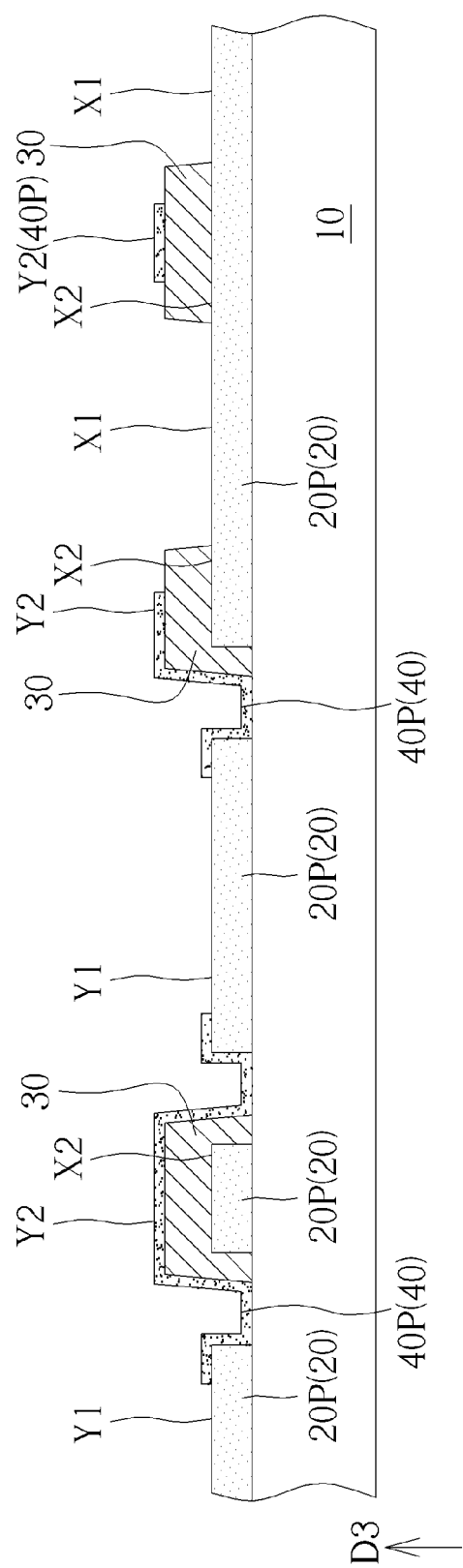

Please refer to FIGS. 9-12. FIGS. 9-12 are schematic diagrams illustrating a method of fabricating a touch panel 104 according to a fourth embodiment of the present invention. The differences between the first embodiment and the fourth embodiment, as illustrated in FIG. 9, are that the first patterned transparent conductive layer 20P of this embodiment further includes a plurality of first-direction electrodes X1 and a plurality of second-direction electrodes Y. The first connection electrode X2 is disposed between two adjacent first-direction electrode X1 in the first direction D1 for electrically connecting the first direction electrodes X1. In other words, the first-direction electrodes X1, the first connection electrode X2 and the second-direction electrodes Y1 may be formed only by the first patterned transparent conductive layer 2 OP. The first connection electrodes X2 and the first-direction electrode X1 are monolithically formed and directly connected with each other. Next, as illustrated in FIG. 10, a plurality of the insulating blocks 30 are formed and each of the insulating blocks 30 at least partially covers corresponding first connection electrode X2. Then, as illustrated in FIG. 11, the second patterned transparent conductive layer 40P is formed. It is worth noting that the second patterned transparent conductive layer 40P may only include the second connection electrode Y2, and the second connection electrode Y2 is disposed between two adjacent second-direction electrodes Y1 in the second direction D2 for electrically connecting the second-direction electrodes Y1. In other words, the first-direction electrodes X1 and the second-direction electrodes Y1 of this embodiment may only be formed by the first patterned transparent conductive layer 20P and do not include part of the second patterned transparent conductive layer 40P, so the first-direction electrode X1 and the second-direction electrode Y1 may be regarded as an electrode consisting of single transparent conductive layer, but not limited thereto.

Figure 13:
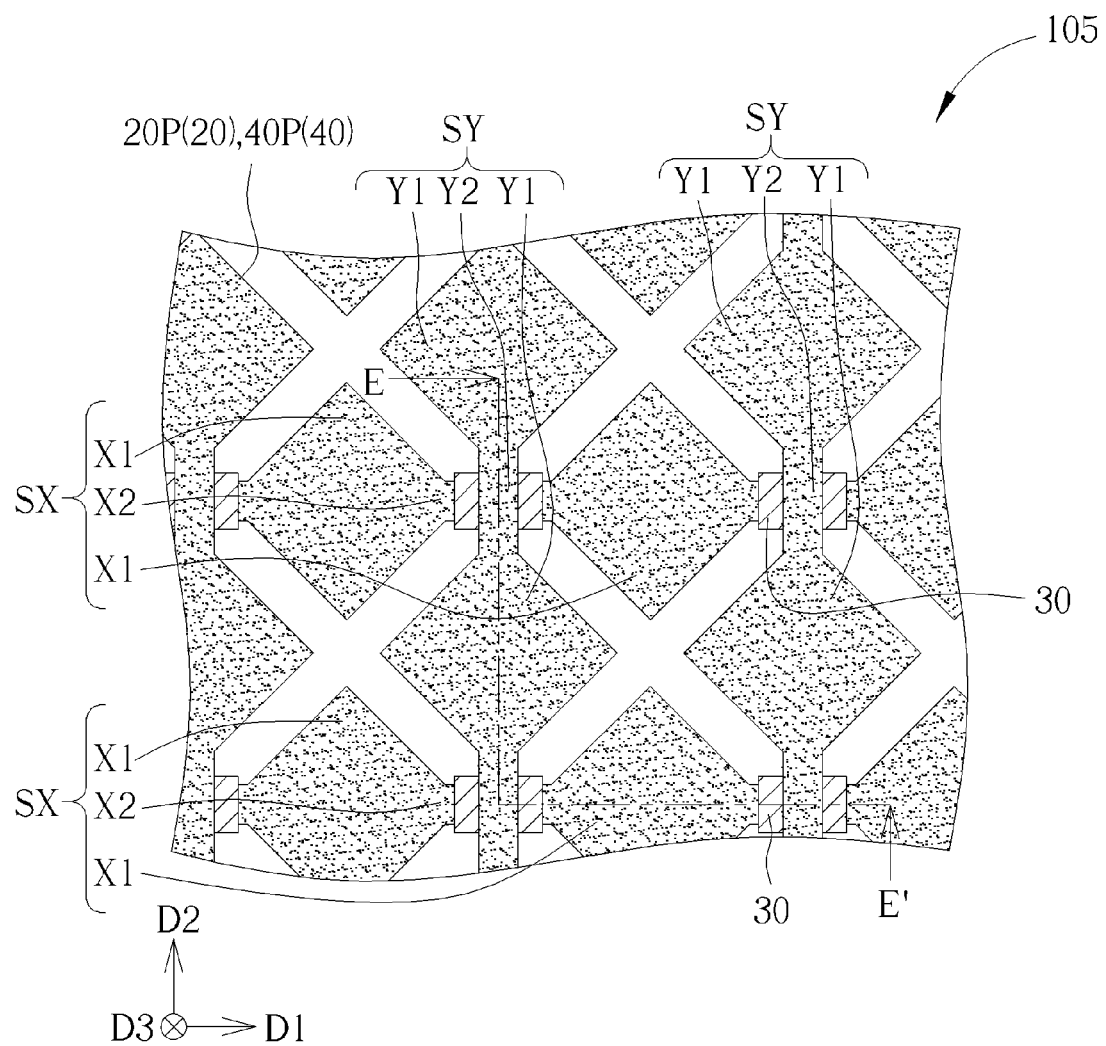
FIG. 13 is a schematic diagram illustrating a touch panel according to a fifth embodiment of the present invention.
Figure 14:
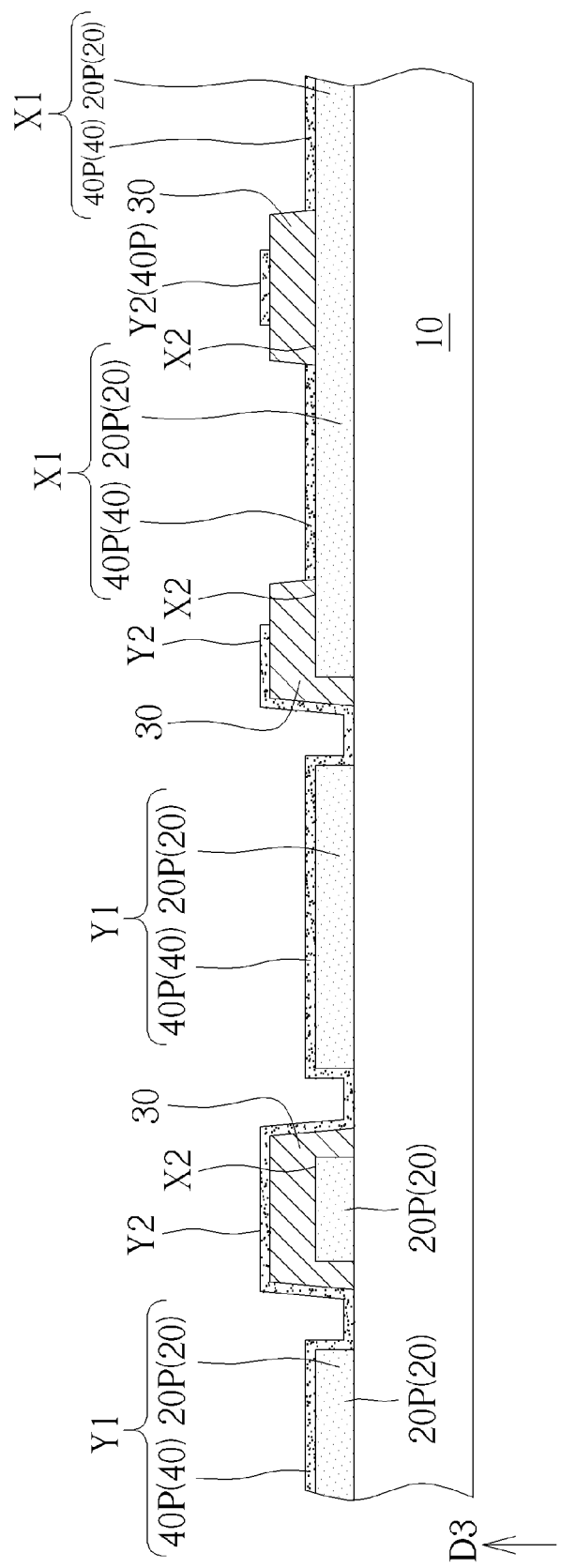
FIG. 14 is a cross-sectional view taken along a cross-sectional line E-E' of FIG. 13.

Please refer to FIG. 13 and FIG. 14. FIG. 13 is schematic diagram illustrating a touch panel 105 of the fifth embodiment of the present invention, and FIG. 14 is a cross-sectional view taken along a cross-sectional line E-E' of FIG. 13. The differences between the fourth embodiment and the fifth embodiment are that the auxiliary electrode AX in the touch panel 105 is disposed between two adjacent first-direction electrode X1 in the first direction D1 for electrically connecting the first-directions X1, the second connection electrode Y2 is disposed between two adjacent second-direction electrode Y1 in the second direction D2 for electrically connecting the second-direction electrodes Y1, each of the first-direction electrodes X1 is composed of a part of the second patterned transparent conductive a layer 40P and a part of the first patterned transparent conductive layer 20P, and each of the second-direction electrodes Y1 is composed of another part of the second patterned transparent conductive electrode 40P and another part of the first patterned transparent conductive layer 20P. The first-direction electrodes X1 and the second-direction electrodes Y1 are composed of the first patterned transparent conductive layer 20P and the second patterned transparent conductive later 40P that overlap each other in the vertical direction D3 and roughly have the same shape. More specifically, each of the first-direction electrodes X1 preferably consists of a part of the second patterned transparent conductive layer 40P and a part of the first patterned transparent conductive layer 20P that overlap each other, and each of the second-direction electrodes Y1 preferably consists of another part of the second patterned transparent conductive electrode 40P and another part of the first patterned transparent conductive electrode 20P that overlap each other, but not limited thereto. In other embodiments of the present invention, more layers such as three layers of transparent conductive layer may be used to form the first-direction electrodes X1 and/or the second-direction electrodes Y1, or thin metal layer may be disposed between the first patterned transparent conductive layer 20P and the second patterned transparent conductive layer 40P that overlap each other to form the first-direction electrodes X1 and/or the second-direction electrodes Y1.

Figure 15:
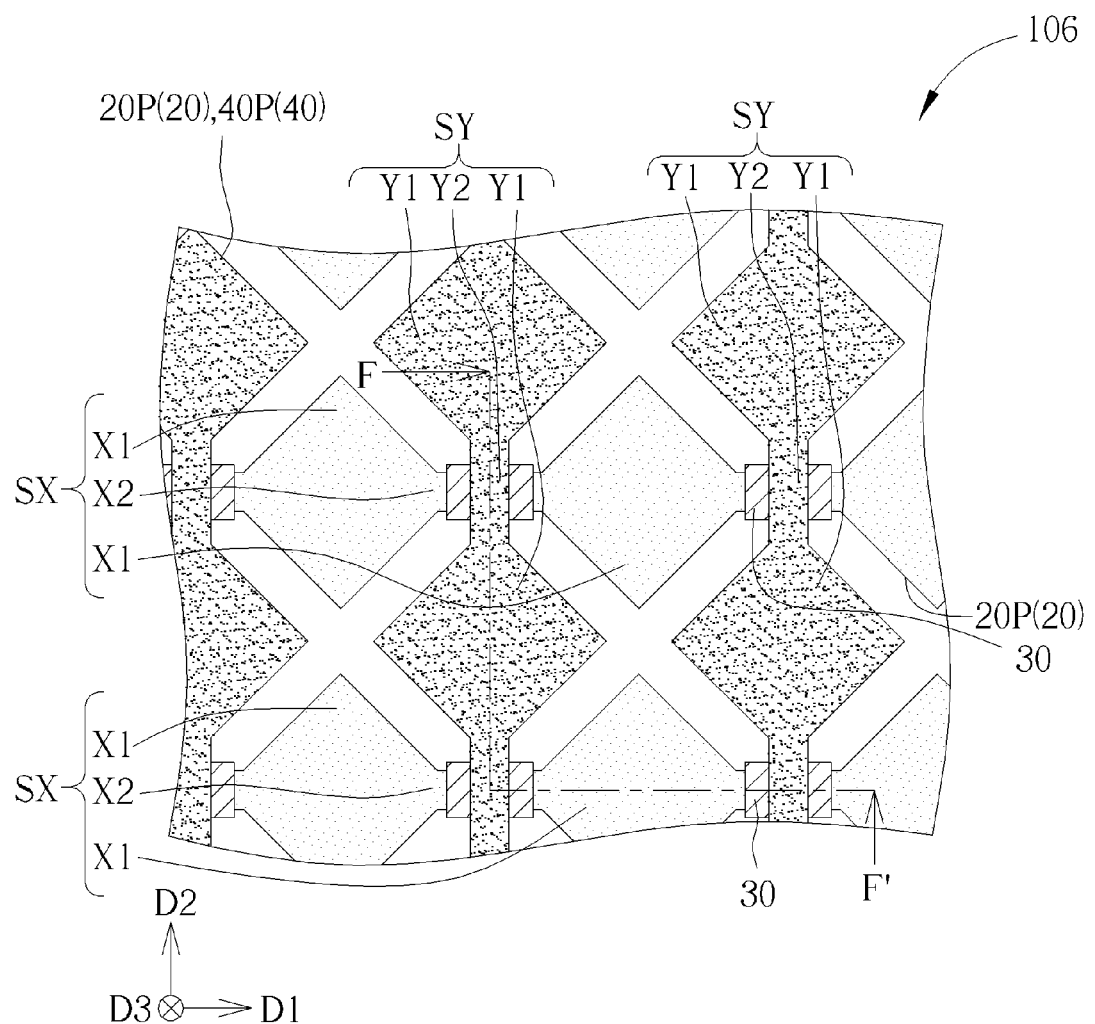
FIG. 15 is a schematic diagram illustrating a touch panel according to a sixth embodiment of the present invention.
Figure 16:
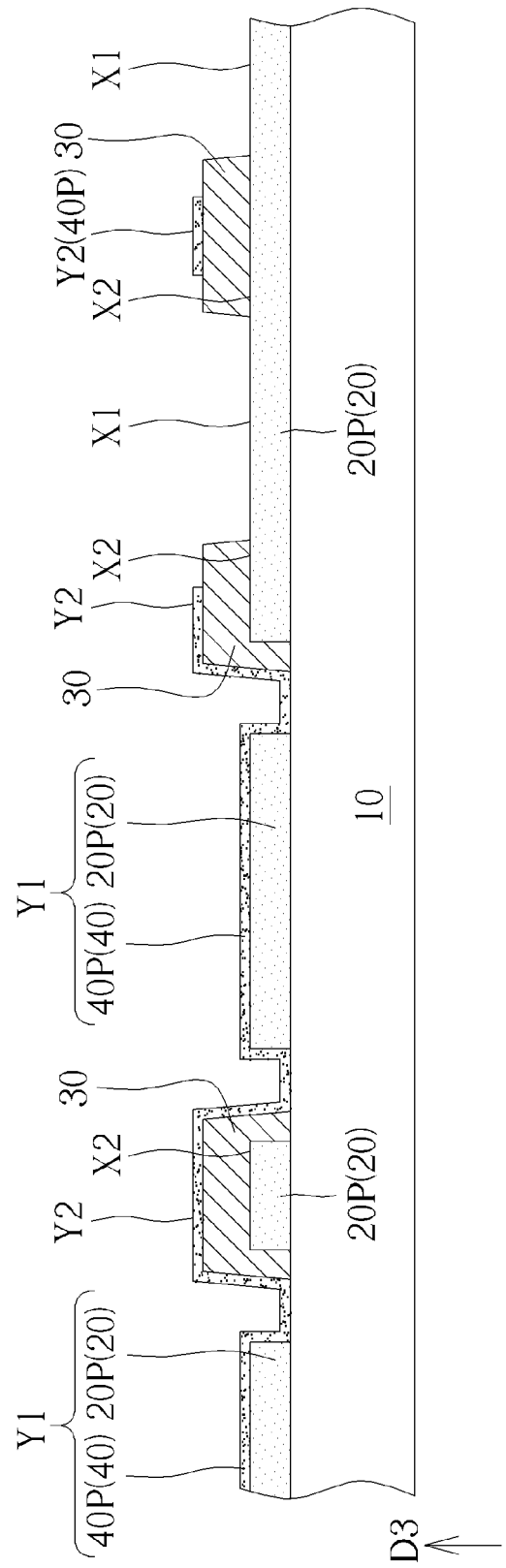
FIG. 16 is a cross-sectional view taken along a cross-sectional line F-F' of FIG. 15.

Please refer to FIG. 15 and FIG. 16. FIG. 15 is a schematic diagram illustrating a touch panel 106 of a sixth embodiment of the present invention, and FIG. 16 is a cross-sectional view taken along a cross-sectional line F-F' of FIG. 15. The difference between the first embodiment and the sixth embodiment is that the first patterned transparent conductive layer 20 Pin this embodiment further includes a plurality of the first-direction electrodes X1, the first connection electrode X2 is disposed between two adjacent first-direction electrodes X1 in the first direction D1 for electrically connecting the first-direction electrodes X1, the second connection electrode Y2 is disposed between two adjacent second-direction electrodes Y1 in the second direction D2, and each of the second-direction electrodes Y1 is composed of apart of the second patterned transparent conductive layer 40P and a part of the first patterned transparent conductive layer 20P. In other words, in this embodiment, each of the first-direction electrodes X1 may be regarded as a single transparent conductive layer electrode, and each of the second-direction electrodes Y1 may be regarded as a double transparent conductive layer electrode. Accordingly, each of the second-direction electrodes Y1 consists of a part of the second patterned transparent conductive layer 40P and a part of the first patterned transparent conductive layer 20P that overlap each other. Therefore, the mismatch between the first patterned transparent conductive layer 20P and the second patterned transparent conductive layer 40P in the first-direction electrode X1 that comes from misalignment may be avoided, and the consistency of first-direction electrodes X1 may be improved accordingly.

To summarize the above descriptions, in the touch panel and the method of fabricating the touch panel of the present invention, the relatively thinner second patterned transparent conductive layer is used to form the second connection electron on the insulating block, and the relatively thicker first patterned transparent conductive layer is employed to provide relatively lower resistance in the first-direction electrodes, the second-direction electrodes, and the first connection electrode. Therefore, in the case of maintaining low resistance, the defects in the second connection electrode that influence the production yield and reliability may be avoided. Besides, in the present invention, the relatively low resistance auxiliary electrode may be formed on the second connection electrode for compensating the resistance influence of the thinner second connection electrode. The auxiliary electrode the peripheral traces may be formed simultaneously so no extra process is needed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
   a substrate;
   a first patterned transparent conductive layer disposed on the substrate, wherein the first patterned transparent conductive layer includes a plurality of first-direction electrodes, a plurality of second-direction electrodes and at least one first connection electrode, wherein the first connection electrode is disposed between two adjacent first-direction electrodes in a first direction for electrically connecting the first-direction electrodes;

at least one insulating block disposed on the substrate and at least partially covering the first connection electrode; and a second patterned transparent conductive layer disposed on the insulating block and the first patterned transparent conductive layer, wherein the second patterned transparent conductive layer includes at least one second connection electrode disposed on the insulating block, the second connection electrode is disposed between two adjacent second-direction electrodes in a second direction for electrically connecting the second-direction electrodes, a thickness of the second patterned transparent conductive layer is smaller than a thickness of the first patterned transparent conductive layer, and a gap is existed between the insulating block and one of the second-direction electrodes adjacent to the insulating block.

2. The touch panel according to claim 1, wherein each of the second-direction electrodes is composed of a part of the second patterned transparent conductive layer and a part of the first patterned transparent conductive layer.

3. The touch panel according to claim 2, wherein each of the second-direction electrodes consists of a part of the second patterned transparent conductive layer and a part of the first patterned transparent conductive layer that overlap each other.

4. The touch panel according to claim 1, wherein each of the first-direction electrodes is composed of a part of the second patterned transparent conductive layer and a part of the first patterned transparent conductive layer, and each of the second-direction electrodes is composed of another part of the second patterned transparent conductive layer and another part of the first patterned transparent conductive layer.

5. The touch panel according to claim 4, wherein each of the first-direction electrodes consists of a part of the second patterned transparent conductive layer and a part of the first patterned transparent conductive layer that overlap each other, and each of the second-direction electrodes consists of another part of the second patterned transparent conductive layer and another part of the first patterned transparent conductive layer that overlap each other.

6. The touch panel according to claim 1, further comprising at least one auxiliary electrode disposed on the insulating block, wherein the resistivity of the auxiliary electrode is smaller than the resistivity of the second patterned transparent conductive layer and the resistivity of the first patterned transparent conductive layer.

7. The touch panel according to claim 6, wherein the auxiliary electrode is disposed on the second connection electrode and electrically connected to the second connection electrode.

8. The touch panel according to claim 6, wherein the auxiliary electrode is disposed between the second connection electrode and the insulating block and electrically connected to the second connection electrode.

9. A method of fabricating a touch panel, comprising:

forming a first patterned transparent conductive layer on a substrate, wherein the first patterned transparent conductive layer comprises:

a plurality of openings; and a first connection electrode, disposed between the two adjacent openings in a second direction;

forming at least one insulating block on the substrate, wherein the insulating block covers the first connection electrode and a part of the openings;

forming a second transparent conductive layer covering the first patterned transparent conductive layer and the insulating block; and applying a patterning process to the first patterned transparent conductive layer and the second transparent conductive layer to form a plurality of first-direction electrodes, a plurality of second-direction electrodes, and at least one second connection electrode, wherein the first connection electrode is disposed between two adjacent first-direction electrodes in the first direction for electrically connecting the first-direction electrodes, and the second connection electrode is at least partially disposed on the insulating block and disposed between two adjacent second-direction electrodes in the second direction for electrically connecting the second-direction electrodes, wherein the second transparent conductive layer is patterned by the patterning process to be a second patterned transparent conductive layer, and a thickness of the second patterned transparent conductive layer is smaller than a thickness of the first patterned transparent conductive layer.

10. The method of fabricating the touch panel according to claim 9, wherein each of the first-direction electrodes is composed of a part of the first patterned transparent conductive layer and a part of the second patterned transparent conductive layer that overlap each other.

11. The method of fabricating the touch panel according to claim 9, wherein each of the second-direction electrodes is composed of a part of the first patterned transparent conductive layer and a part of the second patterned transparent conductive layer that overlap each other.

12. The method of fabricating the touch panel according to claim 9, wherein the second connection electrode is composed of a part of the second patterned transparent conductive layer.

13. The method of fabricating the touch panel according to claim 9, further comprising forming an auxiliary electrode on the insulating block, wherein the resistivity of the auxiliary electrode is smaller than the resistivity of the second patterned transparent conductive layer and the resistivity of the first patterned transparent conductive layer.

14. The method of fabricating the touch panel according to claim 13, wherein the auxiliary electrode is formed on the second connection electrode and electrically connected to the second connection electrode.

15. The method of fabricating the touch panel according to claim 13, wherein the auxiliary electrode is formed between the second connection electrode and the insulating block, and the auxiliary electrode is electrically connected to the second connection electrode.

16. The method of fabricating the touch panel according to claim 13, further comprising forming a plurality of peripheral traces on the substrate, wherein the peripheral traces are electrically connected to the first patterned transparent conductive layer and/or the second patterned transparent conductive layer, and the auxiliary electrode and the peripheral traces are formed by one identical patterned metal layer.

* * * * *